United States Patent

Glidden

[15] 3,649,760

[45] Mar. 14, 1972

[54] BANDPASS AMPLIFIER CIRCUIT

[72] Inventor: Roger C. Glidden, 12 Pleasant Street, Wenham, Mass. 01984

[22] Filed: July 22, 1969

[21] Appl. No.: 843,339

[52] U.S. Cl. ....................179/1 A, 179/1 F

[51] Int. Cl. ....................H03f 1/34

[58] Field of Search ....................179/1 A, 1 F, 1 FS; 330/109, 330/99, 94, 31, 28

[56] References Cited

UNITED STATES PATENTS

| | | | |
|---|---|---|---|
| 3,263,180 | 7/1966 | Dencker | 330/99 |
| 3,278,854 | 10/1966 | Ko-Hsin | 330/109 |
| 3,356,962 | 12/1967 | Morgan | 330/109 |
| 3,436,670 | 4/1969 | Solomon | 330/31 |
| 3,466,559 | 9/1969 | Ruby | 330/109 |
| 3,252,007 | 5/1966 | Saari | 330/99 |
| 2,178,072 | 10/1939 | Fritzinger | 330/99 |
| 2,584,386 | 2/1952 | Hare | 330/99 |
| 3,473,136 | 10/1969 | Akiyama | 330/28 |

FOREIGN PATENTS OR APPLICATIONS

| | | | |
|---|---|---|---|
| 1,188,665 | 3/1965 | Germany | 179/1 VL |

*Primary Examiner*—Kathleen H. Claffy
*Assistant Examiner*—Jon Bradford Leaheey
*Attorney*—Clarence A. O'Brien and Harvey B. Jacobson

[57] ABSTRACT

Audiofrequency signals within a narrow band width are converted into switching signals by a multistage amplifier circuit having a resonant feedback path, an input signal attenuator and a capacitive shunt network associated with an interstage coupling-reducing amplifier gain at signal frequencies above the resonant frequency of the feedback path to decrease amplifier impedance and to isolate low DC bias voltage applied to each amplifier stage.

6 Claims, 1 Drawing Figure

PATENTED MAR 14 1972 3.649,760
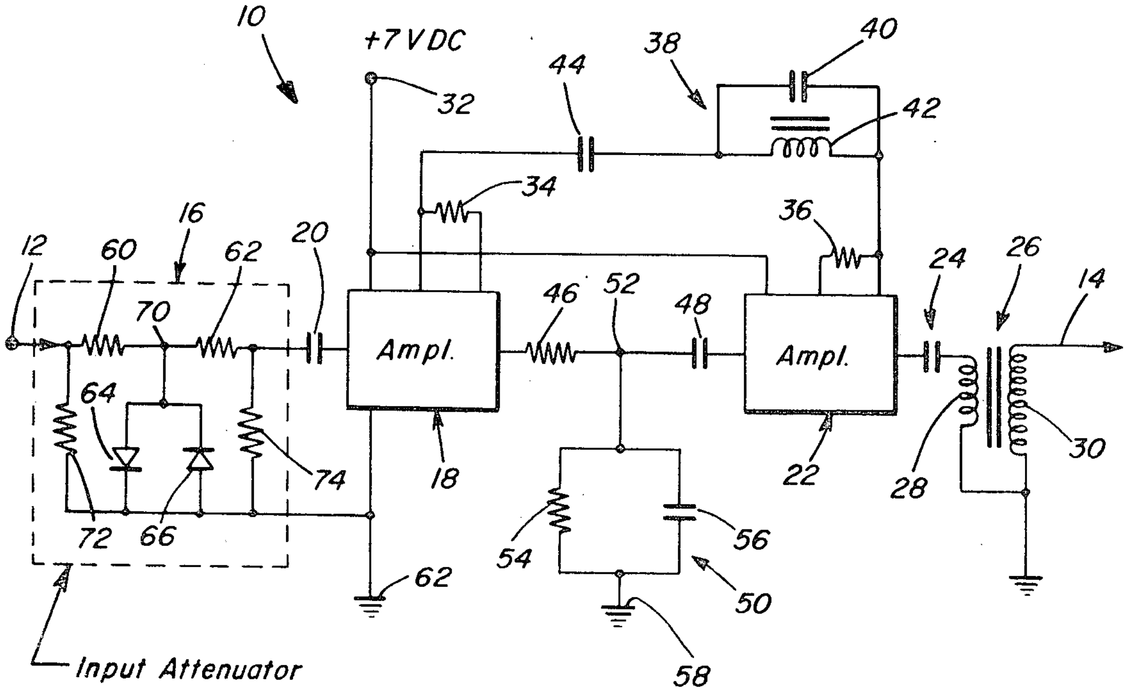
Roger C. Glidden
INVENTOR.
BY Clarence A. O'Brien
and Harvey B. Jacobson
Attorneys

BANDPASS AMPLIFIER CIRCUIT

In the control of automatic equipment associated with telephone communication systems, it was found necessary to provide transistor-switching pulses in response to audiofrequency tone bursts received from a telephone line. Since such tone bursts are infrequently generated, the need exists for a reliable standby band-pass amplifier capable of handling the signal whenever received with a minimum amount of power consumption. In order to maintain a low-power-consuming band-pass amplifier operative with a low standby voltage source, special problems arise in connection with its design. It is known for example that class B amplifiers are generally suitable for transmission of signals with a relatively low power loss but must have a low-input impedance and require a well-regulated low-impedance drive. The bias for such amplifiers must also be maintained constant and this presents a problem particularly where a low-voltage power supply is available.

It is therefore an important object of the present invention to not only provide a band-pass amplifier having a low-input impedance and meet power regulation requirements for audio frequencies, but will also provide a high-frequency selectivity and reliable operation with low-power consumption.

In accordance with the present invention, the band-pass amplifier circuit utilizes at least two commercially available amplifier sections for narrow bandwidth transmission and having self-bias voltage-regulating facilities. These amplifiers are interconnected in a circuit which includes an input attenuator for limiting peak-to-peak voltages of the input signal and provide impedance matching between the telephone line and the first amplifier section. Each amplifier stage is provided with its own feedback path so as to limit transmission to a narrow frequency bandwidth while a main frequency-determining feedback path is interconnected between the amplifier section. Interstage coupling and a capacitive shunt network further reduces the impedance at certain frequencies while an output transformer increases the amplitude of the output voltage swing for transistor driving purposes.

These together with other objects and advantages which will become subsequently apparent reside in the details of construction and operation as more fully hereinafter-described and claimed, reference being had to the accompanying drawings forming a part hereof, wherein like numerals refer to like parts throughout, and in which:

Referring now to the drawings in detail, the bandpass amplifier circuit generally denoted by reference numeral 10 in the drawing is adapted to be supplied with audio signals or tone bursts from a telephone line at the input 12 and provide transistor-switching signals at the output line 14 when tone bursts are received at the input point 12 at a predetermined frequency. The input signal is conducted through an input attenuator 16 to an input section 18 of the amplifier circuit to which the attenuator is capacitively coupled by the signal-coupling capacitor 20. The input section 18 is coupled to an output amplifier section 22, which in turn is capacitively coupled by a signal coupling capacitor 24 to a voltage step-up transformer 26 having a primary winding 28 and a secondary winding 30 to which the output line 14 is connected. The amplifier sections 18 and 22 are commercially available amplifiers such as RCA CA3021 amplifiers. This type of amplifier is shown and described in "RCA-Integrated Circuits Application Notes," printed in the U.S. Aug. 1967 and circulated by Radio Corporation of America, Electronic Components and Devices, Harrison, New Jersey. Each of these amplifiers has two transistor amplifying stages with common ground and DC supply terminals for all applications. Also, in all applications, an external feedback loop is established for the output stage through feedback terminals bypassing an emitter follower associated with the input stage.

The amplifiers 18 and 22 are maintained operative by connection of the power supply terminals thereof to a DC bias voltage supply at 32 capable of applying a +7VDC voltage with 2 milliamps current. In order to render the amplifier sections 18 and 22 frequency responsive within the desired band pass, the feedback terminals of the amplifier sections are respectively interconnected by negative feedback resistors 34 and 36 establishing the aforementioned external feedback loop in each amplifier section. A main frequency determining feedback path is however established between the amplifier sections by a tank circuit section 38 which includes a parallel connected capacitor 40 and inductance 42, having capacitance and inductance values selected in accordance with a desired resonant frequency. The tank circuit is connected to the output stage of the amplifier section 22 and coupled with the output of the input stage of amplifier section 18 through the negative feedback signal coupling capacitor 44 to thereby bracket a total of three amplifying stages of the two amplifier sections 18 and 22 in the described embodiment.

The amplifier sections are interconnected by a series RC-network including the signal coupling resistor 46 and capacitor 48. A capacitive shunt network 50 is connected to the junction 52 between coupling resistor 46 and capacitor 48 and includes parallel-connected resistor 54 and shunt capacitor 56 connected to ground 58. The resistors 46 and 54 decrease the voltage gain of the amplifier circuit at all frequencies, whereas the resistor 46 and shunt capacitor 56 reduces the voltage gain only at high frequencies well above the resonant frequency of the tank circuit 38. The signal coupling capacitors 20, 48 and 24 are effective to isolate the relatively low DC bias voltages applied from source 32 to the amplifier stages.

The input attenuator 16 includes series connected, signal-transmitting resistors 60 and 62 connected between the input 12 and the signal-coupling capacitor 20. A voltage clipping circuit including the shunt diodes 64 and 66 are connected between ground 68 and the junction 70 between the signal transmitting resistors 60 and 62. Thus, the input attenuator is effective to limit peak-to-peak input voltage at any frequency passed by the signal coupling capacitor 20. The shunt resistor 72 connected between the input 12 and the resistor 60 matches the impedance of the telephone line while the shunt resistor 74 connected between the resistor 62 and capacitor 20 in combination with the clipping diodes 64 and 66 limit the voltage swing across the diodes so that the diodes appear to be open when a small input signal is received whereas higher input voltages are reduced by the ratio of the resistance of resistor 74 to the total resistance of resistors 60 and 62.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a low power, band-pass amplifier circuit having at least two low-impedance amplifier sections with relatively narrow audiofrequency bandwidths, an external feedback network interconnecting the amplifier sections establishing a low-impedance feedback path for signals at a predetermined feedback frequency within the bandwidths of the amplifier sections, interstage coupling means interconnecting the amplifier sections and capacitive shunt means connected to the interstage coupling means for substantially reducing the voltage gain of the amplifier circuit at frequencies above said predetermined feedback frequency, each of said amplifier sections includes input and output stages and a resistive feedback loop establishing said relatively narrow bandwidths, said external feedback network being connected to the output stage of one of the amplifier sections and means capacitively coupling the external feedback network to the input stage of the other of the amplifier sections.

2. The combination of claim 1 wherein the external feedback network includes a resonant tank section through which resonance is obtained at said predetermined feedback frequency.

3. The combination of claim 1 including an input telephone line, signal coupling means connecting the telephone line to one of the amplifier sections, and output transistor driving means connected to the other of the amplifier sections.

4. The combination of claim 1 including an output coupling transformer connected to a final stage of the amplifier circuit for increasing the output voltage swing, a DC source of bias voltage connected to each of the amplifier stages, and coupling capacitors interconnecting the amplifier stages with the output transformer and with each other isolating the DC bias voltage within the respective amplifier stages.

5. In combination with a low-standby power supply, a bandpass circuit adapted to convert audio signals from a telephone line within a narrow frequency bandwidth into transistor switching signals, comprising an input attenuator connected to the telephone line, a first negative feedback amplifier section capacitively coupled to the input attenuator, a second negative feedback amplifier section, a voltage step-up transformer capacitively coupled to the second amplifier section for transmitting the switching signals, an interstage coupling resistor and capacitor connected in series between the first and second amplifier sections, a parallel RC-grounded shunt network connected to the junction of the coupling resistor and capacitor for reducing voltage gain at relatively high frequencies, and a tank circuit section interconnecting the amplifier sections for negative voltage feedback at a resonant frequency substantially below said relatively high frequencies.

6. The combination of claim 5 wherein said input attenuator includes a pair of signal-conducting resistors connected in series between the telephone line and the first amplifier stage, a pair of input-impedance-matching resistors connected in shunt relation to the signal conducting resistors for respectively matching the impedance of the telephone line and reducing the input voltage to the first amplifier stage, and clipping diode means connected in shunt relation to the signal conducting resistors at a junction therebetween for limiting peak voltages of the input audio signals.

* * * * *